(12) United States Patent
Xu et al.

(10) Patent No.: US 10,202,310 B2
(45) Date of Patent: Feb. 12, 2019

(54) CARBON COMPOSITES

(71) Applicants:Zhiyue Xu, Cypress, TX (US); Lei Zhao, Houston, TX (US)

(72) Inventors: Zhiyue Xu, Cypress, TX (US); Lei Zhao, Houston, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 41 days.

(21) Appl. No.: 15/059,351

(22) Filed: Mar. 3, 2016

(65) Prior Publication Data

US 2016/0176764 A1    Jun. 23, 2016

Related U.S. Application Data

(62) Division of application No. 14/488,851, filed on Sep. 17, 2014, now Pat. No. 9,325,012.

(51) Int. Cl.
*C04B 35/78* (2006.01)
*C04B 35/71* (2006.01)
(Continued)

(52) U.S. Cl.
CPC ............ *C04B 35/78* (2013.01); *C04B 35/522* (2013.01); *C04B 35/536* (2013.01);
(Continued)

(58) Field of Classification Search
CPC .... H01M 4/133; H01M 4/1393; H01M 4/583; H01M 4/621; H01M 4/625;
(Continued)

(56) References Cited

U.S. PATENT DOCUMENTS 3,246,369 A   4/1966   Rhoads et al.
3,561,770 A   2/1971   Corsi et al.
(Continued)

FOREIGN PATENT DOCUMENTS

CA    2429780 A1   12/2003
EP    0539011 A1    4/1993
(Continued)

OTHER PUBLICATIONS

Baxter et al., "Microstructure and solid particle erosion of carbon-based materials used for the protection of highly porous carbon-carbon composite thermal insulation", Journal of Materials Science, vol. 32, 1997, pp. 4485-4492.
(Continued)

*Primary Examiner* — Lisa S Park
(74) *Attorney, Agent, or Firm* — Cantor Colburn LLP

(57) ABSTRACT

A carbon composite comprises: at least two carbon microstructures; and a binding phase disposed between the at least two carbon microstructures; wherein the binding phase includes a binder comprising one or more of the following SiO$_2$; Si; B; B$_2$O$_3$; a metal; or an alloy of the metal, and the metal is at least one of aluminum; copper; titanium; nickel; tungsten; chromium; iron; manganese; zirconium; hafnium; vanadium; niobium; molybdenum; tin; bismuth; antimony; lead; cadmium; or selenium.

19 Claims, 9 Drawing Sheets

(51) Int. Cl.
| | |
|---|---|
| H01M 4/133 | (2010.01) |
| H01M 4/1393 | (2010.01) |
| H01M 4/36 | (2006.01) |
| H01M 4/62 | (2006.01) |
| C04B 35/52 | (2006.01) |
| C04B 35/536 | (2006.01) |
| C04B 35/63 | (2006.01) |
| C04B 35/80 | (2006.01) |
| C04B 35/82 | (2006.01) |
| C04B 35/83 | (2006.01) |
| C04B 35/645 | (2006.01) |
| C04B 38/00 | (2006.01) |
| C22C 1/05 | (2006.01) |
| B22F 7/06 | (2006.01) |
| H01M 4/38 | (2006.01) |
| H01M 4/583 | (2010.01) |
| H01M 4/66 | (2006.01) |

(52) U.S. Cl.
CPC ........ *C04B 35/6316* (2013.01); *C04B 35/645* (2013.01); *C04B 35/71* (2013.01); *C04B 35/806* (2013.01); *C04B 35/82* (2013.01); *C04B 35/83* (2013.01); *C04B 38/0022* (2013.01); *C04B 38/0038* (2013.01); *C04B 38/0041* (2013.01); *C04B 38/0054* (2013.01); *C22C 1/05* (2013.01); *H01M 4/133* (2013.01); *H01M 4/1393* (2013.01); *H01M 4/362* (2013.01); *H01M 4/625* (2013.01); *B22F 7/06* (2013.01); *C04B 2235/349* (2013.01); *C04B 2235/3409* (2013.01); *C04B 2235/3418* (2013.01); *C04B 2235/3472* (2013.01); *C04B 2235/421* (2013.01); *C04B 2235/424* (2013.01); *C04B 2235/428* (2013.01); *C04B 2235/5216* (2013.01); *C04B 2235/5248* (2013.01); *C04B 2235/5292* (2013.01); *C04B 2235/5436* (2013.01); *C04B 2235/5445* (2013.01); *C04B 2235/5454* (2013.01); *C04B 2235/604* (2013.01); *C04B 2235/6021* (2013.01); *C04B 2235/666* (2013.01); *C04B 2235/667* (2013.01); *C04B 2235/77* (2013.01); *C04B 2235/94* (2013.01); *C04B 2235/96* (2013.01); *C04B 2235/9669* (2013.01); *C04B 2235/9692* (2013.01); *H01M 4/386* (2013.01); *H01M 4/583* (2013.01); *H01M 4/665* (2013.01); *H01M 4/668* (2013.01)

(58) Field of Classification Search
CPC ...... H01M 4/9083; H01M 4/96; H01M 4/362; H01M 4/386; H01M 4/668; H01M 4/665; C04B 35/78; C04B 38/0041; C04B 38/0038; C04B 38/0022; C04B 35/645; C04B 38/0054; C04B 35/71; C04B 35/522; C04B 35/82; C04B 35/83; C04B 35/536; C04B 35/806; C04B 35/6316; C04B 2235/667; C04B 2235/5248; C04B 2235/5216; C04B 2235/9692; C04B 2235/96; C04B 2235/77; C04B 2235/666; C04B 2235/9669; C04B 2235/5445; C04B 2235/3409; C04B 2235/3418; C04B 2235/3472; C04B 2235/349; C04B 2235/94; C04B 2235/604; C04B 2235/6021; C04B 2235/5454; C04B 2235/421; C04B 2235/5436; C04B 2235/5292; C04B 2235/428; C04B 2235/424; C22C 1/05; B22F 7/06
See application file for complete search history.

(56) References Cited

U.S. PATENT DOCUMENTS

| | | |
|---|---|---|
| 3,666,852 A | 5/1972 | Burke |
| 3,807,996 A | 4/1974 | Sarah |
| 3,904,405 A | 9/1975 | Russell et al. |
| 3,967,935 A * | 7/1976 | Frehn .................. C22C 29/067 419/17 |
| 3,981,427 A | 9/1976 | Brookes |
| 4,116,451 A | 9/1978 | Nixon et al. |
| 4,205,858 A | 6/1980 | Shimazaki et al. |
| 4,234,638 A | 11/1980 | Yamazoe et al. |
| 4,270,569 A | 6/1981 | Reay et al. |
| 4,372,393 A | 2/1983 | Baker |
| 4,383,970 A * | 5/1983 | Komuro .................. C22C 1/026 420/528 |
| 4,426,086 A | 1/1984 | Fournie et al. |
| 4,567,103 A | 1/1986 | Sara |
| 4,582,751 A | 4/1986 | Vasilos et al. |
| 4,743,033 A | 5/1988 | Guess |
| 4,780,226 A | 10/1988 | Sheets et al. |
| 4,789,166 A | 12/1988 | Rericha et al. |
| 4,798,771 A | 1/1989 | Vogel |
| 4,799,956 A | 1/1989 | Vogel |
| 4,826,181 A | 5/1989 | Howard et al. |
| 4,885,218 A | 12/1989 | Andou et al. |
| 5,117,913 A | 6/1992 | Thernig |
| 5,134,030 A | 7/1992 | Ueda et al. |
| 5,163,692 A | 11/1992 | Schofield et al. |
| 5,195,583 A | 3/1993 | Toon et al. |
| 5,201,532 A | 4/1993 | Salesky et al. |
| 5,225,379 A | 7/1993 | Howard |
| 5,228,701 A | 7/1993 | Greinke et al. |
| 5,247,005 A | 9/1993 | Von Bonin et al. |
| 5,257,603 A | 11/1993 | Bauer et al. |
| 5,283,121 A | 2/1994 | Bordner |
| 5,286,574 A | 2/1994 | Foster et al. |
| 5,362,074 A | 11/1994 | Gallo et al. |
| 5,392,982 A | 2/1995 | Li |
| 5,455,000 A | 10/1995 | Seyferth et al. |
| 5,467,814 A | 11/1995 | Hyman et al. |
| 5,494,753 A | 2/1996 | Anthony |
| 5,495,979 A | 3/1996 | Sastri et al. |
| 5,499,827 A | 3/1996 | Suggs et al. |
| 5,509,555 A | 4/1996 | Chiang et al. |
| 5,522,603 A | 6/1996 | Naitou et al. |
| 5,597,168 A | 1/1997 | Antonini |
| 5,730,444 A | 3/1998 | Notter |
| 5,765,838 A | 6/1998 | Ueda et al. |
| 5,791,657 A | 8/1998 | Cain et al. |
| 5,968,653 A | 10/1999 | Coppella et al. |
| 5,992,857 A | 11/1999 | Ueda et al. |
| 6,020,276 A | 2/2000 | Hoyes et al. |
| 6,027,809 A | 2/2000 | Ueda et al. |
| 6,065,536 A | 5/2000 | Gudmestad et al. |
| 6,075,701 A | 6/2000 | Ali et al. |
| 6,105,596 A | 8/2000 | Hoyes et al. |
| 6,128,874 A | 10/2000 | Olson et al. |
| 6,131,651 A | 10/2000 | Richey, III |
| 6,152,453 A | 11/2000 | Kashima et al. |
| 6,161,838 A | 12/2000 | Balsells |
| 6,182,974 B1 | 2/2001 | Harrelson |
| 6,183,667 B1 | 2/2001 | Kubo et al. |
| 6,234,490 B1 | 5/2001 | Champlin |
| 6,258,457 B1 | 7/2001 | Ottinger et al. |
| 6,273,431 B1 | 8/2001 | Webb |
| 6,383,656 B1 * | 5/2002 | Kimura .................. B22D 19/02 428/212 |
| 6,506,482 B1 | 1/2003 | Burton et al. |
| 6,585,053 B2 | 7/2003 | Coon et al. |
| 6,789,634 B1 | 9/2004 | Denton |
| 6,880,639 B2 | 4/2005 | Rhodes et al. |
| 6,933,531 B1 * | 8/2005 | Ishikawa .................. B22F 3/14 257/76 |
| 7,105,115 B2 | 9/2006 | Shin |
| 7,132,077 B2 * | 11/2006 | Norville ............... B22D 17/007 266/276 |

(56) References Cited

U.S. PATENT DOCUMENTS

| | | |
|---|---|---|
| 7,138,190 B2 | 11/2006 | Bauer et al. |
| 7,470,468 B2 | 12/2008 | Mercuri et al. |
| 7,666,469 B2 | 2/2010 | Weintritt et al. |
| 7,758,783 B2 | 7/2010 | Shi et al. |
| 9,325,012 B1 | 4/2016 | Xu et al. |
| 2001/0003389 A1 | 6/2001 | Pippert |
| 2001/0039966 A1 | 11/2001 | Walpole et al. |
| 2002/0114952 A1 | 8/2002 | Ottinger et al. |
| 2002/0140180 A1 | 10/2002 | Waltenberg et al. |
| 2003/0137112 A1 | 7/2003 | Richter et al. |
| 2004/0043220 A1 | 3/2004 | Hirose et al. |
| 2004/0097360 A1 | 5/2004 | Benitsch et al. |
| 2004/0127621 A1 | 7/2004 | Drzal et al. |
| 2004/0155382 A1 | 8/2004 | Huang et al. |
| 2004/0186201 A1 | 9/2004 | Stoffer et al. |
| 2004/0256605 A1 | 12/2004 | Reinheimer et al. |
| 2006/0042801 A1 | 3/2006 | Hackworth et al. |
| 2006/0220320 A1 | 10/2006 | Potier et al. |
| 2006/0241237 A1* | 10/2006 | Drzal ............... C08K 3/04 524/495 |
| 2006/0249917 A1 | 11/2006 | Kosty |
| 2006/0272321 A1 | 12/2006 | Mockenhaupt et al. |
| 2007/0009725 A1 | 1/2007 | Noguchi et al. |
| 2007/0054121 A1 | 3/2007 | Weintritt et al. |
| 2007/0243407 A1* | 10/2007 | Delannay ............ B22F 7/004 428/650 |
| 2007/0257405 A1 | 11/2007 | Freyer |
| 2008/0128067 A1 | 6/2008 | Sayir et al. |
| 2008/0152577 A1* | 6/2008 | Addiego ............ C01B 32/00 423/460 |
| 2008/0175764 A1 | 7/2008 | Sako |
| 2008/0279710 A1 | 11/2008 | Zhamu et al. |
| 2008/0289813 A1 | 11/2008 | Gewily et al. |
| 2009/0059474 A1 | 3/2009 | Zhamu et al. |
| 2009/0075120 A1 | 3/2009 | Cornie et al. |
| 2009/0130515 A1 | 5/2009 | Son et al. |
| 2009/0151847 A1 | 6/2009 | Zhamu et al. |
| 2009/0302552 A1 | 6/2009 | Leinfelder et al. |
| 2009/0194205 A1 | 8/2009 | Loffler et al. |
| 2010/0003530 A1 | 1/2010 | Ganguli et al. |
| 2010/0098956 A1 | 4/2010 | Sepeur et al. |
| 2010/0122821 A1 | 5/2010 | Corre et al. |
| 2010/0143690 A1 | 6/2010 | Romero et al. |
| 2010/0159357 A1* | 6/2010 | Otawa ............... B29C 43/021 429/508 |
| 2010/0163782 A1 | 7/2010 | Chang et al. |
| 2010/0203161 A1* | 8/2010 | Gehri ................ A01N 25/10 424/649 |
| 2010/0203340 A1 | 8/2010 | Ruoff et al. |
| 2010/0207055 A1 | 8/2010 | Ueno et al. |
| 2010/0266790 A1 | 10/2010 | Kusinski et al. |
| 2011/0033721 A1 | 2/2011 | Rohatgi |
| 2011/0045724 A1 | 2/2011 | Bahukudumbi |
| 2011/0140365 A1 | 6/2011 | Dietle et al. |
| 2011/0157772 A1 | 6/2011 | Zhamu et al. |
| 2011/0187058 A1 | 8/2011 | Curry et al. |
| 2011/0200825 A1 | 8/2011 | Chakraborty et al. |
| 2011/0278506 A1 | 11/2011 | Toyokawa |
| 2012/0107590 A1 | 5/2012 | Xu et al. |
| 2012/0205873 A1 | 8/2012 | Turley |
| 2013/0001475 A1 | 1/2013 | Christ et al. |
| 2013/0045423 A1 | 2/2013 | Lim et al. |
| 2013/0096001 A1 | 4/2013 | Choi et al. |
| 2013/0114165 A1 | 5/2013 | Mosendz et al. |
| 2013/0284737 A1 | 10/2013 | Ju et al. |
| 2013/0287326 A1 | 10/2013 | Porter et al. |
| 2013/0292138 A1 | 11/2013 | Givens et al. |
| 2014/0051612 A1 | 2/2014 | Mazyar et al. |
| 2014/0127526 A1 | 5/2014 | Etschmaier et al. |
| 2014/0224466 A1 | 8/2014 | Lin et al. |
| 2014/0272592 A1 | 9/2014 | Thompkins et al. |
| 2015/0027567 A1 | 1/2015 | Shreve et al. |
| 2015/0034316 A1 | 2/2015 | Hallundbäk et al. |
| 2015/0068774 A1 | 3/2015 | Hallundbäk et al. |
| 2015/0158773 A1 | 6/2015 | Zhao et al. |
| 2015/0267816 A1 | 9/2015 | Boskovski |
| 2016/0032671 A1 | 2/2016 | Xu et al. |
| 2016/0089648 A1 | 3/2016 | Xu et al. |
| 2016/0108703 A1 | 4/2016 | Xu et al. |
| 2016/0130519 A1 | 5/2016 | Lei et al. |
| 2016/0136923 A1 | 5/2016 | Zhao et al. |
| 2016/0136928 A1 | 5/2016 | Zhao et al. |
| 2016/0138359 A1 | 5/2016 | Zhao et al. |
| 2016/0145965 A1 | 5/2016 | Zhao et al. |
| 2016/0145966 A1 | 5/2016 | Zhao et al. |
| 2016/0145967 A1 | 5/2016 | Zhao et al. |
| 2016/0146350 A1 | 5/2016 | Zhao et al. |
| 2016/0160602 A1 | 6/2016 | Ruffo |
| 2016/0176764 A1 | 6/2016 | Xu et al. |
| 2016/0186031 A1 | 6/2016 | Zhao et al. |
| 2016/0333657 A1 | 11/2016 | Zhao et al. |
| 2017/0321069 A1 | 11/2017 | Zhao et al. |
| 2017/0342802 A1 | 11/2017 | Zhao et al. |

FOREIGN PATENT DOCUMENTS

| | | |
|---|---|---|
| EP | 0747615 B1 | 10/2001 |
| EP | 2056004 A1 | 5/2009 |
| EP | 2586963 A1 | 5/2013 |
| JP | S5424910 A | 2/1979 |
| JP | S5491507 A | 7/1979 |
| JP | S58181713 A | 10/1983 |
| JP | S59129142 A | 7/1984 |
| JP | S6131355 A | 2/1986 |
| JP | H0238365 A | 2/1990 |
| JP | H0616404 A | 1/1994 |
| JP | 2014141746 | 8/2014 |
| WO | 9403743 | 2/1994 |
| WO | 03102360 | 12/2003 |
| WO | 2004015150 A2 | 2/2004 |
| WO | 2005115944 | 12/2005 |
| WO | 2007138409 A1 | 12/2007 |
| WO | 2008021033 A2 | 2/2008 |
| WO | 2011039531 A1 | 4/2011 |
| WO | 2014028149 A1 | 2/2014 |
| WO | 2015021627 A1 | 2/2015 |
| WO | 2016085594 A1 | 6/2016 |

OTHER PUBLICATIONS

Etter et al., "Aluminium carbide formation in interpenetrating graphite/aluminium composites", Materials Science and Engineering, Mar. 15, 2007, vol. 448, No. 1, pp. 1-6.

Hutsch et al., "Innovative Metal-Graphite Composites as Thermally Conducting Materials", PM2010 World Congress—PM Functional Materials—Heat Sinks, 2010, 8 pages.

Levin et al., "Solid Particle Erosion Resistance and High Strain Rate Deformation Behavior of Inconel-625 Alloy", Superalloys 718, 625, 706 and Various Derivatives, The Minerals, Metals & Materials Society, 1997, 10 pages.

Miyamoto et al., "Development of New Composites; Ceramic Bonded Carbon", Transactions of JWRI, vol. 38, No. 2, 2009, pp. 57-61.

Moghadam et al, "Functional Metal Matrix Composites: Self-lubricating, Self-healing, and Nanocomposites—An Outlook", The Minerals, Metals & Materials Society, Apr. 5, 2014, 10 pages.

Pohlmann et al., "Magnesium alloy-graphite composites with tailored heat conduction properties for hydrogen storage applications", International Journal of Hydrogen Energy, 35 (2010), pp. 12829-12836.

Rashad et al. "Effect of of Graphene Nanoplatelets addition on mechanical properties of pure aluminum using a semi-powder method", Materials International, Apr. 20, 2014, vol. 24, pp. 101-108.

Tikhomirov et al., "The chemical vapor infiltration of exfoliated graphite to produce carbon/carbon composites", Carbon, 49 (2011), pp. 147-153.

(56) References Cited

OTHER PUBLICATIONS

Yang et al., "Effect of tungsten addition on thermal conductivity of graphite/copper composites", Composites Part B: Engineering, May 31, 2013, vol. 55, pp. 1-4.

* cited by examiner

CARBON COMPOSITES

DOMESTIC PRIORITY

This application is a divisional of U.S. patent application Ser. No. 14/488,851, filed Sep. 17, 2014, the disclosure of which is incorporated by reference herein in its entirety.

BACKGROUND

Graphite is an allotrope of carbon and has a layered, planar structure. In each layer, the carbon atoms are arranged in hexagonal arrays or networks through covalent bonds. Different carbon layers however are held together only by weak van der Waals forces.

Graphite has been used in a variety of applications including electronics, atomic energy, hot metal processing, coatings, aerospace and the like due to its excellent thermal and electrical conductivities, lightness, low friction, and high heat and corrosion resistances. However, graphite is not elastic and has low strength, which may limit its further applications. Thus, the industry is always receptive to new graphite materials having improved elasticity and mechanical strength. It would be a further advantage if such materials also have improved high temperature corrosion resistance.

BRIEF DESCRIPTION

The above and other deficiencies in the prior art are be overcome by, in an embodiment, a carbon composite comprising carbon microstructures having interstitial spaces among the carbon microstructures; and a binder disposed in at least some of the interstitial spaces; wherein the carbon microstructures comprises unfilled voids within the carbon microstructures.

In another embodiment, a carbon composite comprises: at least two carbon microstructures; and a binding phase disposed between the at least two carbon microstructures; wherein the binding phase includes a binder comprising $SiO_2$, Si, B, $B_2O_3$, a metal, an alloy of the metal, or a combination comprising at least one of the foregoing; wherein the metal is at least one of aluminum, copper, titanium, nickel, tungsten, chromium, iron, manganese, zirconium, hafnium, vanadium, niobium, molybdenum, tin, bismuth, antimony, lead, cadmium, and selenium.

The composites can be in the form of a bar, block, sheet, tubular, cylindrical billet, toroid, powder, or pellets.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
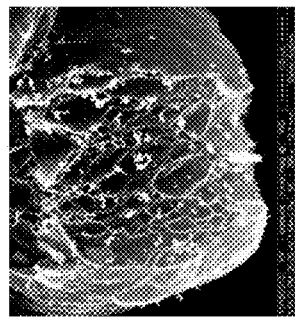
FIG. 1 is a scanning electron microscopic ("SEM") image of a composition containing expanded graphite and a micro- or nano-sized binder blended at room temperature and atmospheric pressure.

The inventors hereof have found that carbon composites formed from graphite and micro- or nano-sized binders at high temperatures have improved balanced properties as compared to graphite alone, a composition formed from the same graphite but different binders, or a mixture of the same graphite and the same binder blended at room temperature under atmospheric pressure or high pressures. The new carbon composites have excellent elasticity. In addition, the carbon composites have excellent mechanical strength, heat resistance, and chemical resistance at high temperatures. In a further advantageous feature, the composites keep various superior properties of the graphite such as heat conductivity, electrical conductivity, lubricity, and the alike.

Without wishing to be bound by theory, it is believed that the improvement in mechanical strength is provided by a binding phase disposed between carbon microstructures. There are either no forces or only weak Van der Waals forces exist between the carbon microstructures, thus the graphite bulk materials have weak mechanical strength. At high temperatures, the micro- and nano-sized binder liquefies and is dispersed evenly among carbon microstructures. Upon cooling, the binder solidifies and forms a binding phase binding the carbon nanostructures together through mechanical interlocking.

Further without wishing to be bound by theory, for the composites having both improved mechanical strength and improved elasticity, it is believed that the carbon microstructures themselves are laminar structures having spaces between the stacked layers. The binder only selectively locks the microstructures at their boundaries without penetrating the microstructures. Thus the unbounded layers within the microstructures provide elasticity and the binding phase disposed between the carbon microstructures provides mechanical strength.

The carbon microstructures are microscopic structures of graphite formed after compressing graphite into highly condensed state. They comprise graphite basal planes stacked together along the compression direction. As used herein, carbon basal planes refer to substantially flat, parallel sheets or layers of carbon atoms, where each sheet or layer has a single atom thickness. The graphite basal planes are also referred to as carbon layers. The carbon microstructures are generally flat and thin. They can have different shapes and can also be referred to as micro-flakes, micro-discs and the like. In an embodiment, the carbon microstructures are substantially parallel to each other.

There are two types of voids in the carbon composites—voids or interstitial spaces between carbon microstructures and voids within each individual carbon microstructures. The interstitial spaces between the carbon microstructures have a size of about 0.1 to about 100 microns, specifically about 1 to about 20 microns whereas the voids within the carbon microstructures are much smaller and are generally between about 20 nanometers to about 1 micron, specifically about 200 nanometers to about 1 micron. The shape of the voids or interstitial spaces is not particularly limited. As used herein, the size of the voids or interstitial spaces refers to the largest dimension of the voids or interstitial spaces and can be determined by high resolution electron or atomic force microscope technology.

The interstitial spaces between the carbon microstructures are filled with a micro- or nano-sized binder. For example, a binder can occupy about 10% to about 90% of the interstitial spaces between the carbon microstructures. However, the binder does not penetrate the individual carbon microstructures and the voids within carbon microstructures are unfilled, i.e., not filled with any binder. Thus the carbon layers within the carbon microstructures are not locked together by a binder. Through this mechanism, the flexibility of the carbon composite, particularly, expanded carbon composite can be preserved.

The carbon microstructures have a thickness of about 1 to about 200 microns, about 1 to about 150 microns, about 1 to about 100 microns, about 1 to about 50 microns, or about 10 to about 20 microns. The diameter or largest dimension of the carbon microstructures is about 5 to about 500 microns or about 10 to about 500 microns. The aspect ratio of the carbon microstructures can be about 10 to about 500, about 20 to about 400, or about 25 to about 350. In an embodiment, the distance between the carbon layers in the carbon microstructures is about 0.3 nanometers to about 1 micron. The carbon microstructures can have a density of about 0.5 to about 3 g/cm$^3$, or about 0.1 to about 2 g/cm$^3$.

As used herein, graphite includes natural graphite, synthetic graphite, expandable graphite, expanded graphite, or a combination comprising at least one of the foregoing. Natural graphite is graphite formed by Nature. It can be classified as "flake" graphite, "vein" graphite, and "amorphous" graphite. Synthetic graphite is a manufactured product made from carbon materials. Pyrolytic graphite is one form of the synthetic graphite. Expandable graphite refers to graphite having intercallant materials inserted between layers of natural graphite or synthetic graphite. A wide variety of chemicals have been used to intercalate graphite materials. These include acids, oxidants, halides, or the like. Exemplary intercallant materials include sulfuric acid, nitric acid, chromic acid, boric acid, $SO_3$, or halides such as $FeCl_3$, $ZnCl_2$, and $SbCl_5$. Upon heating, the intercallant is converted from a liquid or solid state to a gas phase. Gas formation generates pressure which pushes adjacent carbon layers apart resulting in expanded graphite. The expanded graphite particles are vermiform in appearance, and are therefore commonly referred to as worms.

Advantageously, the carbon composites comprise expanded graphite microstructures. Compared with other forms of the graphite, expanded graphite has high flexibility and compression recovery, and larger anisotropy. The composites formed from expanded graphite and micro- or nano-sized binder under high pressure and high temperature conditions can thus have excellent elasticity in addition to desirable mechanical strength.

In the carbon composites, the carbon microstructures are held together by a binding phase. The binding phase comprises a binder which binds carbon microstructures by mechanical interlocking. Optionally, an interface layer is formed between the binder and the carbon microstructures. The interface layer can comprise chemical bonds, solid solutions, or a combination thereof. When present, the chemical bonds, solid solutions, or a combination thereof may strengthen the interlocking of the carbon microstructures. It is appreciated that the carbon microstructures may be held together by both mechanical interlocking and chemical bonding. For example the chemical bonding, solid solution, or a combination thereof may be formed between some carbon microstructures and the binder or for a particular carbon microstructure only between a portion of the carbon on the surface of the carbon microstructure and the binder. For the carbon microstructures or portions of the carbon microstructures that do not form a chemical bond, solid solution, or a combination thereof, the carbon microstructures can be bounded by mechanical interlocking. The thickness of the binding phase is about 0.1 to about 100 microns or about 1 to about 20 microns. The binding phase can form a continuous or discontinuous network that binds carbon microstructures together.

Exemplary binders include $SiO_2$, Si, B, $B_2O_3$, a metal, an alloy, or a combination comprising at least one of the foregoing. The metal can be aluminum, copper, titanium, nickel, tungsten, chromium, iron, manganese, zirconium, hafnium, vanadium, niobium, molybdenum, tin, bismuth, antimony, lead, cadmium, and selenium. The alloy includes the alloys of aluminum, copper, titanium, nickel, tungsten, chromium, iron, manganese, zirconium, hafnium, vanadium, niobium, molybdenum, tin, bismuth, antimony, lead, cadmium, and selenium. In an embodiment, the binder comprises copper, nickel, chromium, iron, titanium, an alloy of copper, an alloy of nickel, an alloy of chromium, an alloy of iron, an alloy of titanium, or a combination comprising at least one of the foregoing metal or metal alloy. Exemplary alloys include steel, nickel-chromium based alloys such as Inconel*, and nickel-copper based alloys such as Monel alloys. Nickel-chromium based alloys can contain about 40-75% of Ni, about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts of iron, manganese, carbon, and silicon. These materials can be in different shapes, such as particles, fibers, and wires. Combinations of the materials can be used.

The binder used to make the carbon composite is micro- or nano-sized. In an embodiment, the binder has an average particle size of about 0.05 to about 10 microns, specifically, about 0.5 to about 5 microns, more specifically about 0.1 to about 3 microns. Without wishing to be bound by theory, it is believed that when the binder has a size within these ranges, it disperses uniformly among the carbon microstructures.

When an interface layer is present, the binding phase comprises a binder layer comprising a binder and an interface layer bonding one of the at least two carbon microstructures to the binder layer. In an embodiment, the binding phase comprises a binder layer, a first interface layer bonding one of the carbon microstructures to the binder layer, and a second interface layer bonding the other of the microstructures to the binder layer. The first interface layer and the second interface layer can have the same or different compositions.

The interface layer comprises a C—metal bond, a C—B bond, a C—Si bond, a C—O—Si bond, a C—O-metal bond, a metal carbon solution, or a combination comprising at least one of the foregoing. The bonds are formed from the carbon on the surface of the carbon microstructures and the binder.

In an embodiment, the interface layer comprises carbides of the binder. The carbides include carbides of aluminum, titanium, nickel, tungsten, chromium, iron, manganese, zirconium, hafnium, vanadium, niobium, molybdenum, or a combination comprising at least one of the foregoing. These carbides are formed by reacting the corresponding metal or metal alloy binder with the carbon atoms of the carbon microstructures. The binding phase can also comprise SiC formed by reacting $SiO_2$ or Si with the carbon of carbon microstructures, or $B_4C$ formed by reacting B or $B_2O_3$ with the carbon of the carbon microstructures. When a combination of binder materials is used, the interface layer can comprise a combination of these carbides. The carbides can be salt-like carbides such as aluminum carbide, covalent carbides such as SiC, $B_4C$, interstitial carbides such as carbides of the group 4, 5, and 5 transition metals, or intermediate transition metal carbides, for example the carbides of Cr, Mn, Fe, Co, and Ni.

In another embodiment, the interface layer comprises a solid solution of carbon and the binder. Carbon have solubility in certain metal matrix or at certain temperature range, which helps both wetting and binding of metal phase onto carbon microstructures. Through heat-treatment, high solubility of carbon in metal can be maintained at low temperature. These metals include Co, Fe, La, Mn, Ni, or Cu. The binder layer can also comprises a combination of solid solutions and carbides.

The carbon composites comprise about 20 to about 95 wt. %, about 20 to about 80 wt. %, or about 50 to about 80 wt. % of carbon, based on the total weight of the composites. The binder is present in an amount of about 5 wt. % to about 75 wt. % or about 20 wt. % to about 50 wt. %, based on the total weight of the composites. In the carbon composites, the weight ratio of carbon relative to the binding is about 1:4 to about 20:1, or about 1:4 to about 4:1, or about 1:1 to about 4:1.

FIG. 1 is a SEM image of a composition containing expanded graphite and a micro- or nano-sized binder blended at room temperature and atmospheric pressure. As shown in FIG. 1, the binder (white area) is only deposited on the surface of some of the expanded graphite worms.

Figure 2:
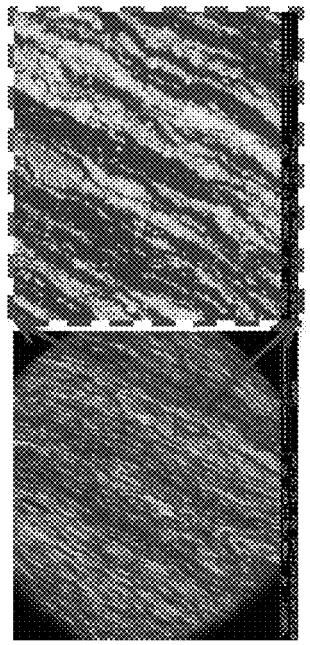
FIG. 2 is a SEM image of a carbon composite formed from expanded graphite and a micro- or nano-sized binder under high pressure and high temperature conditions according to one embodiment of the disclosure.

FIG. 2 is a SEM image of a carbon composite formed from expanded graphite and a micro- or nano-sized binder under high pressure and high temperature conditions. As shown in FIG. 2, a binding phase (light area) is evenly distributed between the expanded graphite microstructures (dark area).

Figure 3:
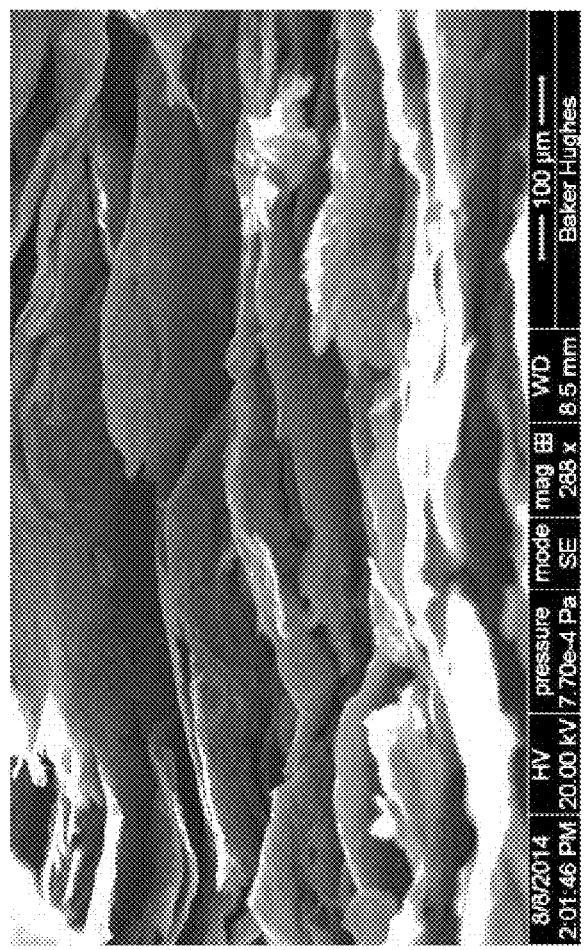
FIG. 3 is a SEM image of carbon microstructures according to another embodiment of the disclosure.
Figure 4:
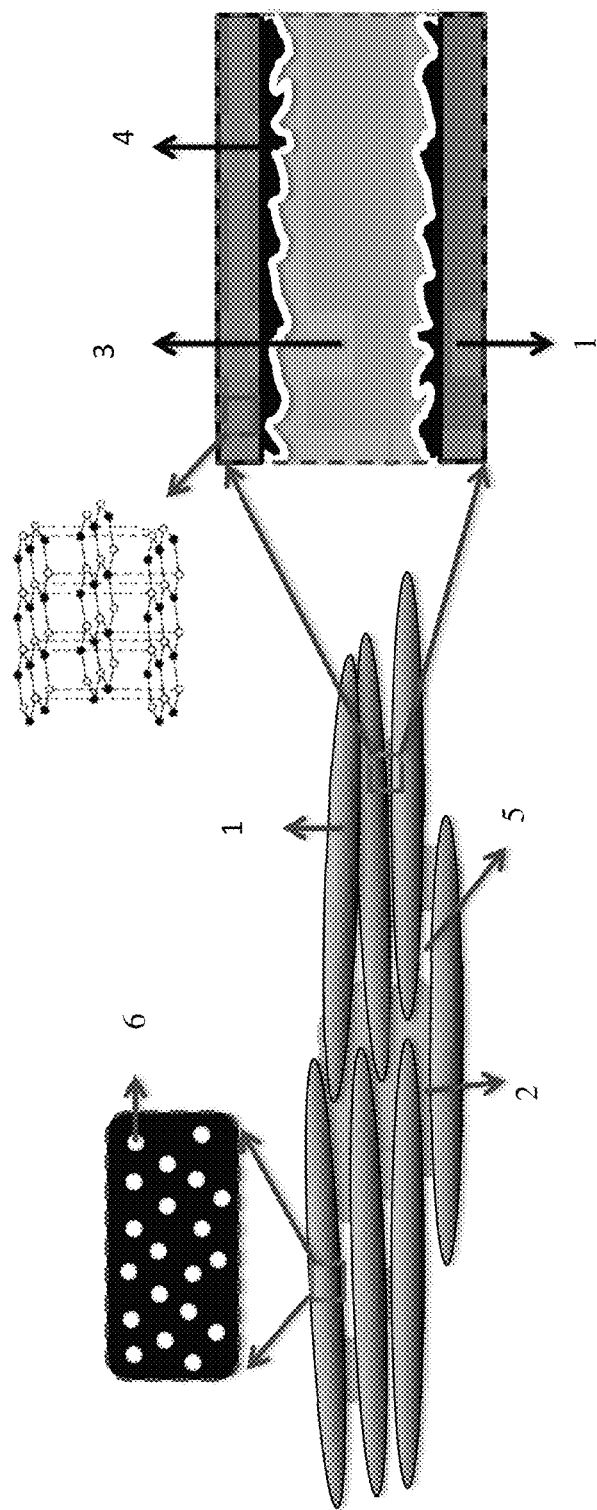
FIG. 4 is a schematic illustration of a carbon composite according to an embodiment of the disclosure.

A SEM image of carbon graphite microstructures are shown in FIG. 3. An embodiment of a carbon composite is illustrated in FIG. 4. As shown in FIG. 4, the composite comprises carbon microstructures 1 and binding phase 2 locking the carbon microstructures. The binding phase 2 comprises binder layer 3 and an optional interface layer 4 disposed between the binder layer and the carbon microstructures. The carbon composite contains interstitial space 5 among carbon microstructures 1. Within carbon microstructures, there are unfilled voids 6.

The carbon composites can optionally comprise a filler. Exemplary filler includes carbon fibers, carbon black, mica, clay, glass fiber, ceramic fibers, and ceramic hollow structures. Ceramic materials include SiC, $Si_3N_4$, $SiO_2$, BN, and the like. The filler can be present in an amount of about 0.5 to about 10 wt. % or about 1 to about 8%.

The composites can have any desired shape including a bar, block, sheet, tubular, cylindrical billet, toroid, powder, pellets, or other form that may be machined, formed or otherwise used to form useful articles of manufacture. The sizes or the dimension of these forms are not particularly limited. Illustratively, the sheet has a thickness of about 10 μm to about 10 cm and a width of about 10 mm to about 2 m. The powder comprises particles having an average size of about 10 μm to about 1 cm. The pellets comprise particles having an average size of about 1 cm to about 5 cm.

One way to form the carbon composites is to compress a combination comprising carbon and a micro- or nano-sized binder to provide a green compact by cold pressing; and to compressing and heating the green compact thereby forming the carbon composites. In another embodiment, the combination can be pressed at room temperature to form a compact, and then the compact is heated at atmospheric pressure to form the carbon composite. These processes can be referred to as two-step processes. Alternatively, a combination comprising carbon and a micro- or nano-sized binder can be compressed and heated directly to form the carbon composites. The process can be referred to as a one-step process.

In the combination, the carbon such as graphite is present in an amount of about 20 wt. % to about 95 wt. %, about 20 wt. % to about 80 wt. %, or about 50 wt. % to about 80 wt. %, based on the total weight of the combination. The binder is present in an amount of about 5 wt. % to about 75 wt. % or about 20 wt. % to about 50 wt. %, based on the total weight of the combination. The graphite in the combination can be in the form of chip, powder, platelet, flake, or the like. In an embodiment, the graphite is in the form of flakes having a diameter of about 50 microns to about 5,000 microns, preferably about 100 to about 300 microns. The graphite flakes can have a thickness of about 1 to about 5 microns. The density of the combination is about 0.01 to about 0.05 $g/cm^3$, about 0.01 to about 0.04 $g/cm^3$, about 0.01 to about 0.03 $g/cm^3$ or about 0.026 $g/cm^3$. The combination can be formed by blending the graphite and the micro- or nano-sized binder via any suitable methods known in the art. Examples of suitable methods include ball mixing, acoustic mixing, ribbon blending, vertical screw mixing, and V-blending.

Referring to the two-step process, cold pressing means that the combination comprising the graphite and the micro-sized or nano-sized binder is compressed at room temperature or at an elevated temperature as long as the binder does not significantly bond with the graphite microstructures. In an embodiment, greater than about 80 wt. %, greater than about 85 wt. %, greater than about 90 wt. %, greater than about 95 wt. %, or greater than about 99 wt. % of the microstructures are not bonded in the green compact. The pressure to form the green compact can be about 500 psi to about 10 ksi and the temperature can be about 20° C. to about 200° C. The reduction ratio at this stage, i.e., the volume of the green compact relative to the volume of the combination, is about 40% to about 80%. The density of the green compact is about 0.1 to about 5 g/cm$^3$, about 0.5 to about 3 g/cm$^3$, or about 0.5 to about 2 g/cm$^3$.

The green compact can be heated at a temperature of about 350° C. to about 1200° C., specifically about 800° C. to about 1200° C. to form the carbon composites. In an embodiment, the temperature is above the melting point of the binder, for example, about 20° C. to about 100° C. higher or about 20° C. to about 50° C. higher than the melting point of the binder. When the temperature is higher, the binder becomes less viscose and flows better, and less pressure may be required in order for the binder to be evenly distributed in the voids between the carbon microstructures. However, if the temperature is too high, it may have detrimental effects to the instrument.

The temperature can be applied according to a predetermined temperature schedule or ramp rate. The means of heating is not particularly limited. Exemplary heating methods include direct current (DC) heating, induction heating, microwave heating, and spark plasma sintering (SPS). In an embodiment, the heating is conducted via DC heating. For example, the combination comprising the graphite and the micro- or nano-sized binder can be charged with a current, which flows through the combination generating heat very quickly. Optionally, the heating can also be conducted under an inert atmosphere, for example, under argon or nitrogen. In an embodiment, the green compact is heated in the presence of air.

The heating can be conducted at a pressure of about 500 psi to about 30,000 psi or about 1000 psi to about 5000 psi. The pressure can be a superatmospheric pressure or a subatmospheric pressure. Without wishing to be bound by theory, it is believed that when a superatmospheric pressure is applied to the combination, the micro- or nano-sized binder is forced into the voids between carbon microstructures through infiltration. When a subatmospheric pressure is applied to the combination, the micro- or nano-sized binder can also be forced into the voids between the carbon microstructures by capillary forces.

In an embodiment, the desirable pressure to form the carbon composites is not applied all at once. After the green compact is loaded, a low pressure is initially applied to the composition at room temperature or at a low temperature to close the large pores in the composition. Otherwise, the melted binder may flow to the surface of the die. Once the temperature reaches the predetermined maximum temperature, the desirable pressure required to make the carbon composites can be applied. The temperature and the pressure can be held at the predetermined maximum temperature and the predetermined maximum temperature for 5 minutes to 120 minutes.

The reduction ratio at this stage, i.e. the volume of the carbon composite relative to the volume of the green compact, is about 10% to about 70% or about 20 to about 40%. The density of the carbon composite can be varied by controlling the degree of compression. The carbon composites have a density of about 0.5 to about 10 g/cm$^3$, about 1 to about 8 g/cm$^3$, about 1 to about 6 g/cm$^3$, about 2 to about 5 g/cm$^3$, about 3 to about 5 g/cm$^3$, or about 2 to about 4 g/cm$^3$.

Alternatively, also referring to a two-step process, the combination can be first pressed at room temperature and a pressure of about 500 psi to 30,000 psi to form a compact; the compact can be further heated at a temperature higher than the melting point of the binder to make the carbon composite. In an embodiment, the temperature can be about 20° C. to about 100° C. higher or about 20° C. to about 50° C. higher than the melting point of the binder. The heating can be conducted at atmospheric pressure.

In another embodiment, the carbon composite can be made from the combination of the graphite and the binder directly without making the green compact. The pressing and the heating can be carried out simultaneously. Suitable pressures and temperatures can be the same as discussed herein for the second step of the two-step process.

Hot pressing is a process that applies temperature and pressure simultaneously. It can be used in both the one-step and the two-step processes to make carbon composites.

The carbon composites can be made in a mold through a one-step or a two-step process. The obtained carbon composites can be further machined or shaped to form a bar, block, tubular, cylindrical billet, or toroid. Machining includes cutting, sawing, ablating, milling, facing, lathing, boring, and the like using, for example, a miller, saw, lathe, router, electric discharge machine, and the like. Alternatively, the carbon composite can be directly molded to the useful shape by choosing the molds having the desired shape.

Sheet materials such as web, paper, strip, tape, foil, mat or the like can also be made via hot rolling. In an embodiment, the carbon composite sheets made by hot rolling can be further heated to allow the binder to effectively bond the carbon microstructures together.

Carbon composite pellets can be made by extrusion. For example, a combination of the graphite and the micro- or nano-sized binder can be first loaded in a container. Then combination is pushed into an extruder through a piston. The extrusion temperature can be about 350° C. to about 1200° C. or about 800° C. to about 1200° C. In an embodiment, the extrusion temperature is higher than the melting point of the binder, for example, about 20 to about 50° C. higher than the melting point of the binder. In an embodiment, wires are obtained from the extrusion, which can be cut to form pellets. In another embodiment, pellets are directly obtained from the extruder. Optionally, a post treatment process can be applied to the pellets. For example, the pellets can be heated in a furnace above the melting temperature of the binder so that the binder can bond the carbon microstructures together if the carbon microstructures have not been bonded or not adequately bonded during the extrusion.

Carbon composite powder can be made by milling carbon composites, for example a solid piece, through shearing forces (cutting forces). It is noted that the carbon composites should not be smashed. Otherwise, the voids within the carbon microstructures may be destroyed thus the carbon composites lose elasticity.

The carbon composites have a number of advantageous properties for use in a wide variety of applications. In an especially advantageous feature, by forming carbon composites, both the mechanical strength and the elastomeric properties are improved.

Figure 5:
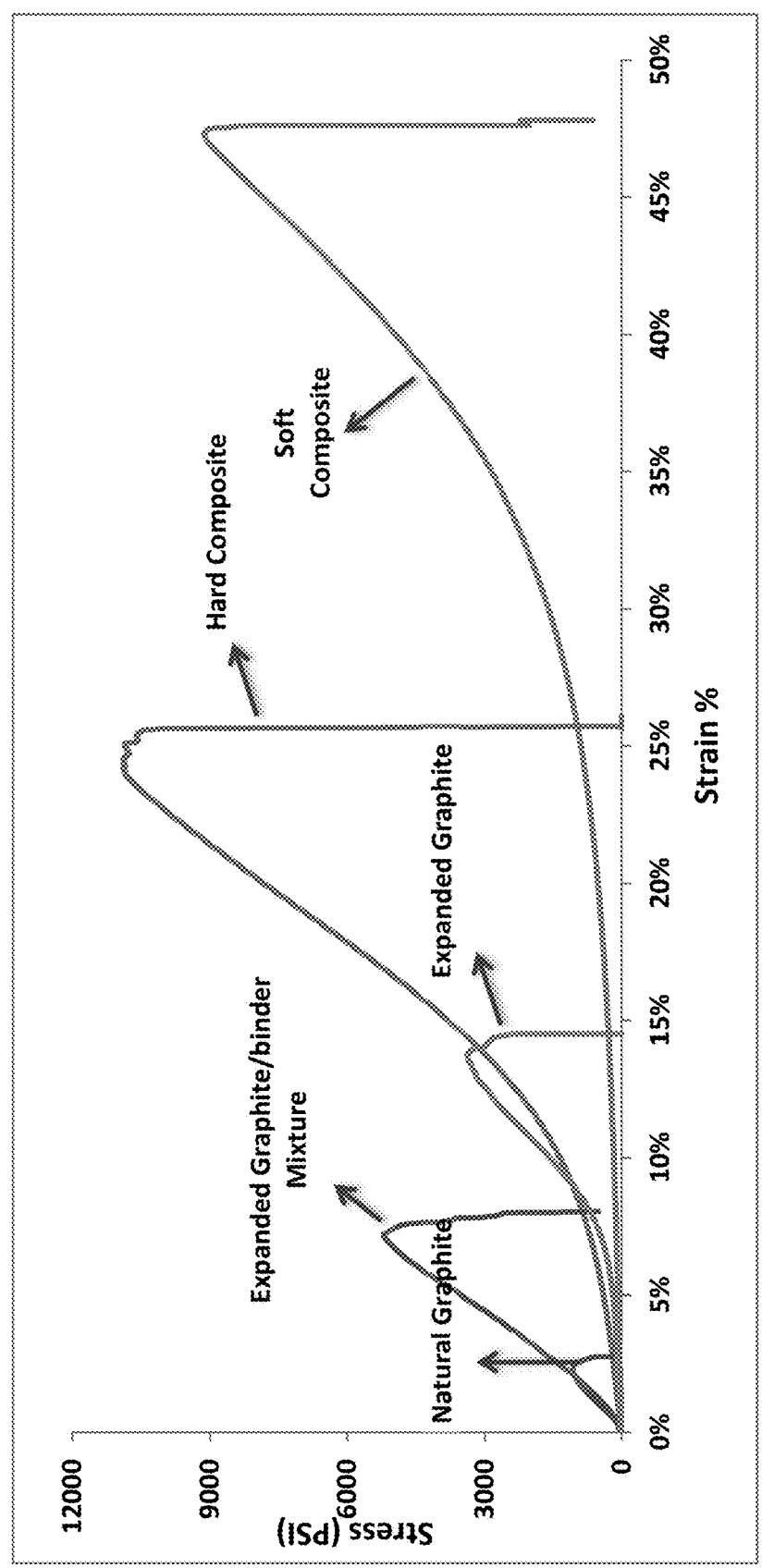
FIG. 5 shows stress-strain curves of (A) natural graphite; (B) expanded graphite; (C) a mixture of expanded graphite and a micro- or nano-sized binder, where the sample is compacted at room temperature and high pressure; (D) a carbon composite according to one embodiment of the disclosure compacted from a mixture of expanded graphite and a micro- or nano-sized binder at a high temperature and a low pressure (also referred to as "soft composite"); and (E) a carbon composite according to another embodiment of the disclosure formed from expanded graphite and a micro- and nano-sized binder under high pressure and high temperature conditions (also referred to as "hard composite")

To illustrate the improvement of elastic energy achieved by the carbon composites, the stress-strain curves for the following samples are shown in FIG. 5: (A) natural graphite, (B) expanded graphite, (C) a mixture of expanded graphite and a micro- or nano-sized binder formed at room temperature and atmospheric pressure, (D) a mixture of expanded graphite and a micro- or nano-sized binder formed by at a high temperature and atmospheric pressure; and (E) a carbon composite formed from expanded graphite and a micro- and nano-sized binder under high pressure and high temperature conditions. For the natural graphite, the sample was made by compressing natural graphite in a steel die at a high pressure. The expanded graphite sample was also made in a similar manner.

As shown in FIG. 5, the natural graphite has a very low elastic energy (area under the stress-strain curve) and is very brittle. The elastic energy of expanded graphite and the elastic energy of the mixture of expanded graphite and a micro- or nano-sized binder compacted at room temperature and high pressure is higher than that of the natural graphite. Conversely, both the hard and soft carbon composites of the disclosure exhibit significantly improved elasticity shown by the notable increase of the elastic energy as compared to the natural graphite alone, the expanded graphite alone, and the mixture of expanded graphite and binder compacted at room temperature and high pressure. In an embodiment, the carbon composites have an elastic elongation of greater than about 4%, greater than about 6%, or between about 4% and about 40%.

Figure 6:
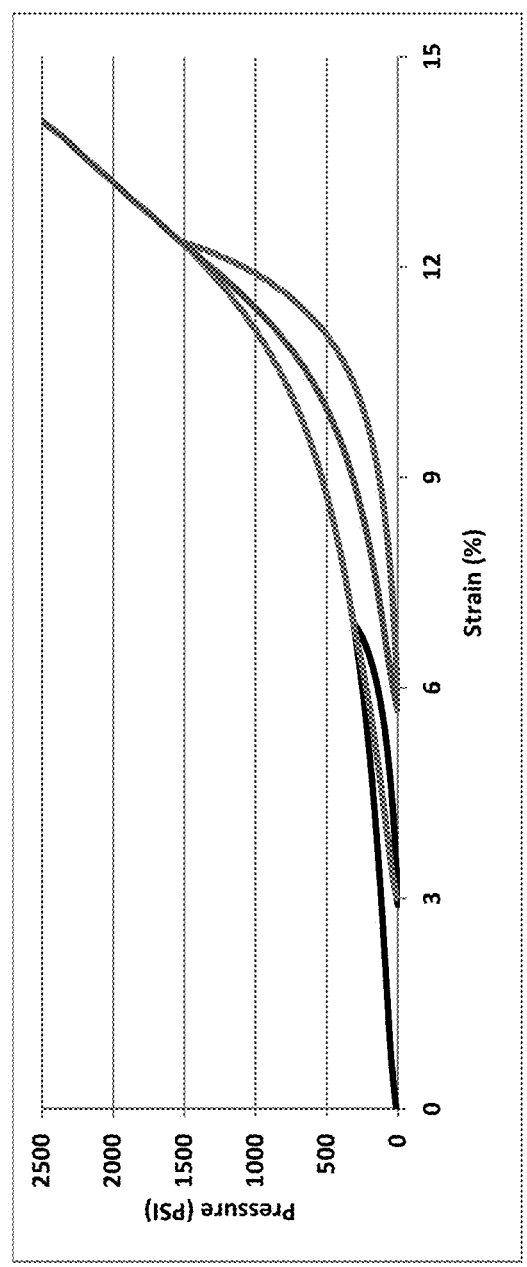
FIG. 6 shows loop test results of a carbon composite at different loadings.
Figure 7:
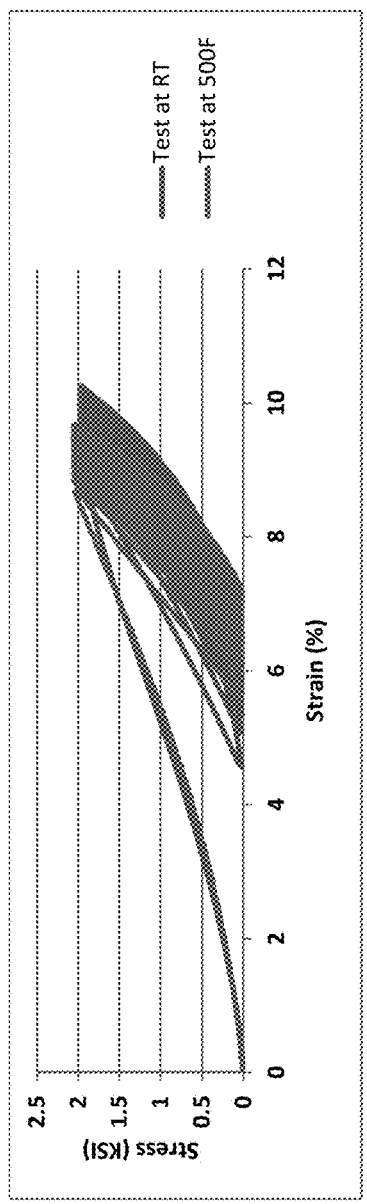
FIG. 7 shows hysteresis results of a carbon composite tested at room temperature and 500° F. respectively.

The elasticity of the carbon composites is further illustrated in FIGS. 6 and 7. FIG. 6 shows loop test results of a carbon composite at different loadings. FIG. 7 shows hysteresis results of a carbon composite tested at room temperature and 500° F. respectively. As shown in FIG. 7, the elasticity of the carbon composite is maintained at 500° F.

Figure 8:
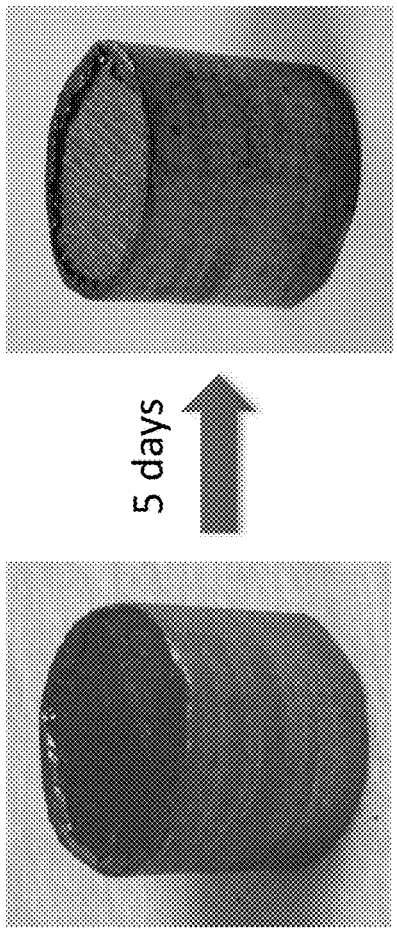
FIG. 8 compares a carbon composite before and after exposing to air at 500° C. for 25 hours.
Figure 9A:
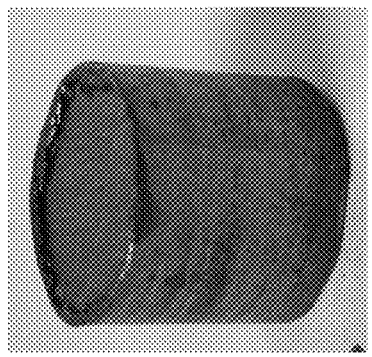
FIG. 9(A) is a photo of a carbon composite after a thermal shock.
Figure 9B:
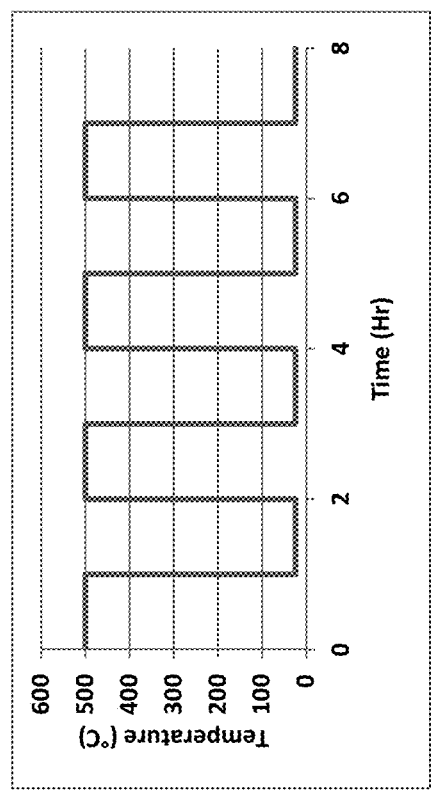
FIG. 9(B) illustrates the condition for the thermal shock.

In addition to mechanical strength and elasticity, the carbon composites can also have excellent thermal stability at high temperatures. FIG. 8 compares a carbon composite before and after exposing to air at 500° C. for 25 hours. FIG. 9(A) is a photo of a carbon composite sample after a thermo shock for 8 hours. The condition for the thermal shock is shown in FIG. 9(B). As shown in FIGS. 8 and 9(A), there are no changes to the carbon composite sample after exposing to air at 500° C. for 25 hours or after the thermal shock. The carbon composites can have high thermal resistance with a range of operation temperatures from about −65° F. up to about 1200° F., specifically up to about 1100° F., and more specifically about 1000° F.

Figure 10:
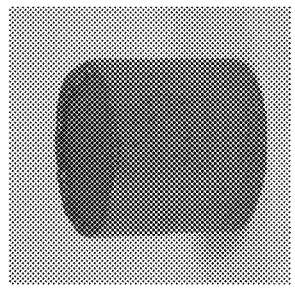
FIG. 10 compares a carbon composite sample (A) before and (B) after exposing to tap water for 20 hours at 200° F., or (C) after exposing to tap water for 3 days at 200° F.
Figure 10:
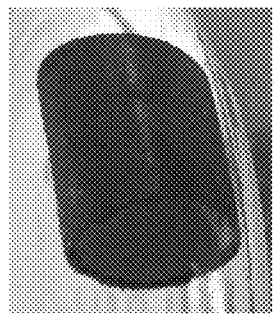
Figure 10:
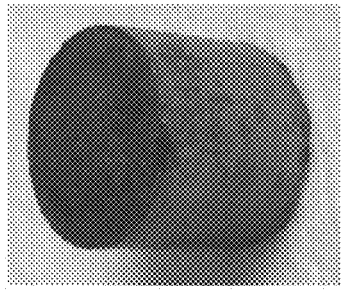
Figure 11:
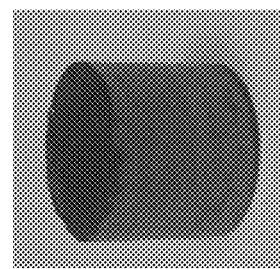
FIG. 11 compares a carbon composite sample (A) before and (B) after exposing to 15% HCl solution with inhibitor at 200° F. for 20 hours, or (C) after exposing to 15% HCl solution at 200° F. for 3 days.
Figure 11:
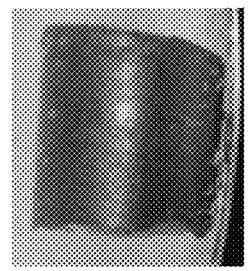
Figure 11:
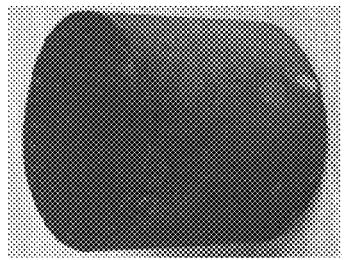

The carbon composites can also have excellent chemical resistance at elevated temperatures. In an embodiment, the composite is chemically resistant to water, oil, brines, and acids with resistance rating from good to excellent. In an embodiment, the carbon composites can be used continuously at high temperatures and high pressures, for example, about 68° F. to about 1200° F., or about 68° F. to about 1000° F., or about 68° F. to about 750° F. under wet conditions, including basic and acidic conditions. Thus, the carbon composites resist swelling and degradation of properties when exposed to chemical agents (e.g., water, brine, hydrocarbons, acids such as HCl, solvents such as toluene, etc.), even at elevated temperatures of up to 200° F., and at elevated pressures (greater than atmospheric pressure) for prolonged periods. The chemical resistance of the carbon composite is illustrated in FIGS. 10 and 11. FIG. 10 compares a carbon composite sample before and after exposing to tap water for 20 hours at 200° F., or after exposing to tap water for 3 days at 200° F. As shown in FIG. 10, there are no changes to the sample. FIG. 11 compares a carbon composite sample before and after exposing to 15% HCl solution with inhibitor at 200° F. for 20 hours, or after exposing to 15% HCl solution at 200° F. for 3 days. Again, there are no changes to the carbon composite sample.

The carbon composites are medium hard to extra hard with harness from about 50 in SHORE A up to about 75 in SHORE D scale.

Figure 12:
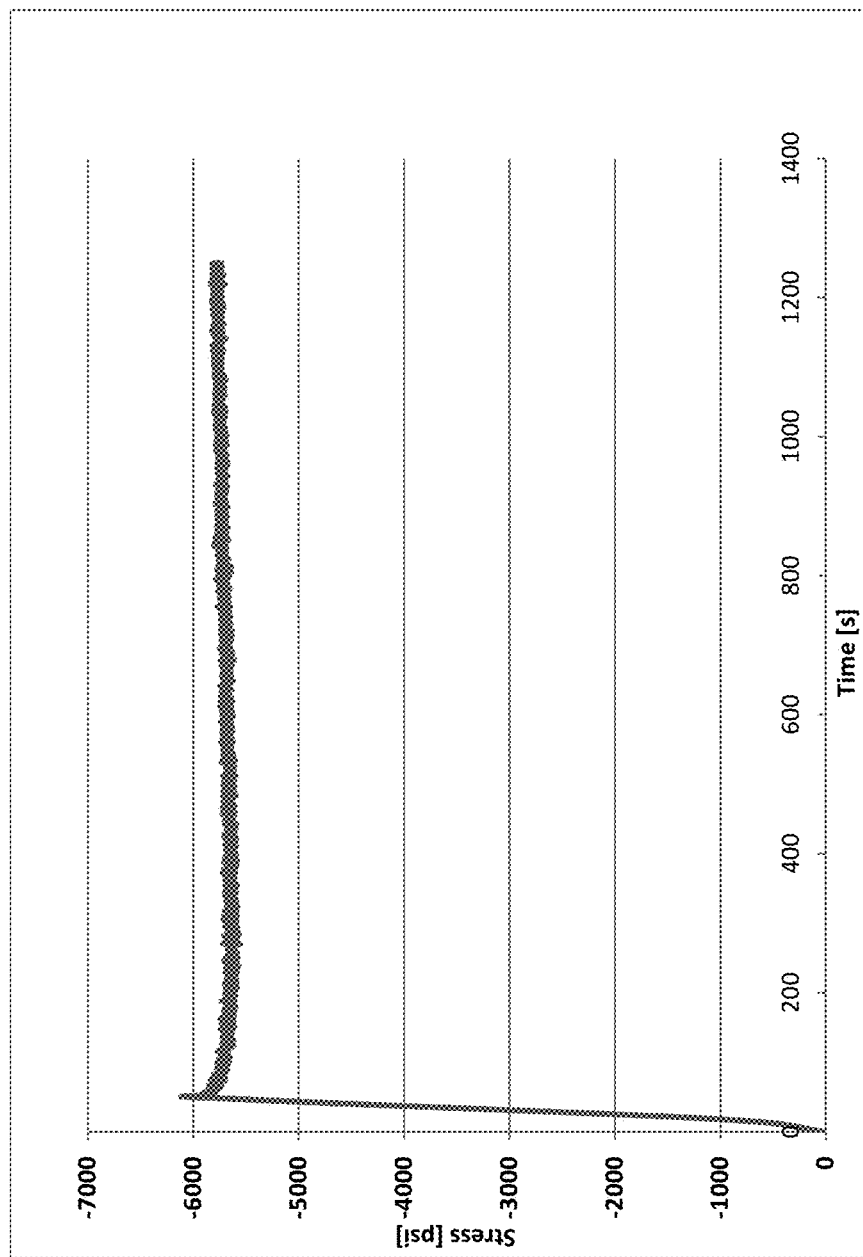
FIG. 12 shows the sealing force relaxation test results of a carbon composite at 600° F.

As a further advantageous feature, the carbon composites have stable sealing force at high temperatures. The stress decay of components under constant compressive strain is known as compression stress relaxation. A compression stress relaxation test also known as sealing force relaxation test measures the sealing force exerted by a seal or O-ring under compression between two plates. It provides definitive information for the prediction of the service life of materials by measuring the sealing force decay of a sample as a function of time, temperature and environment. FIG. 12 shows the sealing force relaxation test results of a carbon composite sample 600° F. As shown in FIG. 12, the sealing force of the carbon composite is stable at high temperatures. In an embodiment, the sealing force of a sample of the composite at 15% strain and 600° F. is maintained at about 5800 psi without relaxation for at least 20 minutes.

The carbon composites are useful for preparing articles for a wide variety of applications including but are not limited to electronics, atomic energy, hot metal processing, coatings, aerospace, automotive, oil and gas, and marine applications. Exemplary articles include seals, bearings, bearing seats, packers, valves, engines, reactors, cooling systems, and heat sinks. Thus, in an embodiment, an article comprises the carbon composites. The carbon composites may be used to form all or a portion of an article.

The article can be a downhole element. Illustrative articles include seals, seal bore protector, swabbing element protector, components of frac plug, bridge plug, compression packing elements (premier seal), expanding packing elements (ARC seal), O-rings, bonded seals, bullet seals, subsurface safety valve (SSSV) dynamic seals, SSSV flapper seals, V rings, back up rings, drill bit seals, or ESP seals. In an embodiment, the article is a packer, a seal, or an O-ring.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant (s) includes at least one colorants). "Or" means 'and/or." "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A carbon composite comprising:
   at least two carbon microstructures, the carbon microstructures having basal planes stacked together, and the carbon microstructures having an aspect ratio of about 10 to about 500 and being substantially parallel to each other; and
   a binding phase disposed between the at least two carbon microstructures;
   the binding phase including a binder comprising one or more of the following: $SiO_2$; Si; B; $B_2O_3$; a metal; or an alloy of the metal; wherein the metal is at least one of aluminum; copper; titanium; nickel; tungsten; chromium; iron; manganese; zirconium; hafnium; vanadium; niobium; molybdenum; tin; bismuth; antimony; lead; cadmium, or selenium,
   wherein the binding phase comprises a binder layer and an interface layer bonding one of the at least two carbon microstructures to the binder layer, and the interface layer comprises one or more of the following: a C—O-metal bond; or a metal carbon solution.

2. The carbon composite of claim 1, wherein the weight ratio of the at least two carbon microstructures relative to the binding phase is about 1:1 to about 4:1.

3. The carbon composite of claim 1, wherein the binding phase binds the at least two carbon microstructures through mechanical interlocking.

4. The carbon composite of claim 1, wherein each of the at least two carbon microstructures comprises voids having a size of about 20 nm to about 1,000 nm.

5. The carbon composite of claim 4, wherein the carbon microstructures have a thickness of about 1 to about 200 microns, a diameter of about 10 to about 500 microns, and a density of about 0.1 to 2 $g/cm^3$.

6. The carbon composite of claim 1, wherein the carbon microstructures comprise microstructures of graphite.

7. The carbon composite of claim 6, wherein the graphite comprises one or more of the following: expanded graphite; expandable graphite; natural graphite; or synthetic graphite.

8. The carbon composite of claim 1, wherein the carbon microstructures comprise microstructures of expanded graphite.

9. The carbon composite of claim 1, wherein the binder comprises one or more of the following: steel; nickel-chromium based alloys; or nickel-copper based alloys.

10. The carbon composite of claim 1, further comprising one or more of the following: carbon fibers; carbon black; mica; clay; glass fiber; ceramic fibers; or ceramic hollow structures.

11. The carbon composite of claim 1, wherein the interface layer comprises a C—O-metal bond.

12. The carbon composite of claim 1, comprising about 50 to about 80 wt. % of the carbon, based on the total weight of the carbon composite.

13. The carbon composite of claim 1, wherein the carbon composite has a density of about 0.5 to about 10 $g/cm^3$.

14. The carbon composite of claim 1, wherein the composite has at least one of the following properties:
   the composite has thermal resistance with a range of operation temperatures from about −65° F. up to about 1200° F.;
   the composition has an elastic elongation of greater than 4%;
   the composite is chemically resistant to water, oil, brine; and acids;
   the composite has a hardness from about 50 in SHORE A up to about 75 in SHORE D scale; and
   a sealing force of a sample of the composite at 15% strain and 600° F. is maintained at about 5800 psi without relaxation for at least 20 minutes.

15. The carbon composite of claim 1, wherein the composite is in the form of a bar, block, sheet, tubular, cylindrical billet, toroid, powder, or pellets.

16. A sheet comprising the carbon composite of claim 1, wherein the sheet has a thickness of about 10 μm to about 10 cm.

17. A powder comprising the carbon composite of claim 1, wherein the powder comprises particles having an average size of about 10 μm to about 1 cm.

18. A plurality of pellets comprising the carbon composite of claim 1, wherein the pellets comprise particles having an average size of about 0.5 cm to about 5 cm.

19. The carbon composite of claim 5, wherein the carbon microstructures comprise microstructures of expanded graphite.

* * * * *